United States Patent [19]
Sanvido et al.

[11] Patent Number: 5,638,788
[45] Date of Patent: Jun. 17, 1997

[54] AUTOMOTIVE ACTUATOR INTERFACE

[75] Inventors: David Jeffrey Sanvido, Novi; Mike Livshiz, Southfield; Sharanjit Singh, Farmington Hills, all of Mich.

[73] Assignee: General Motors Corporation, Detroit, Mich.

[21] Appl. No.: 661,680

[22] Filed: Jun. 11, 1996

[51] Int. Cl.$^6$ .............................. F02D 41/16; F02D 41/28
[52] U.S. Cl. ........................... 123/339.2; 364/431.12
[58] Field of Search ........................ 123/339.14, 339.2; 364/431.12

[56] References Cited

U.S. PATENT DOCUMENTS

| | | | |
|---|---|---|---|
| 5,429,088 | 7/1995 | Lang et al. | 123/339.14 |
| 5,463,993 | 11/1995 | Livshits et al. | 123/339.2 |

Primary Examiner—Andrew M. Dolinar
Attorney, Agent, or Firm—Michael J. Bridges

[57] ABSTRACT

Control and functional isolation of an actuator applied to an internal combustion engine through an interface module which is interposed between the actuator and a controller having a control function, with state of the actuator estimated, converted to standard units of measure, and corrected in the interface module in response to an estimate of a parameter influenced by the actuator state, the parameter expressed in the standard units of measure, and the corrected state applied as feedback to the controller which, through application of the control function, issues to the module a desired state. The desired state is restored by removing a correction value from the desired state, is converted to actuator position units, and is applied to control actuator position.

13 Claims, 3 Drawing Sheets

AUTOMOTIVE ACTUATOR INTERFACE

FIELD OF THE INVENTION

This invention relates to internal combustion engine control and, more particularly, to control and functional isolation of an engine control actuator.

BACKGROUND OF THE INVENTION

A significant effort is required to integrate an actuator into an automotive control system, including substantial control system recalibration procedures. Non-linearities, biases, and actuator performance tolerances must be accounted for, resulting in significant integration time, complexity, error, and expense. To account for actuator error, for example due to part-to-part actuator deviation, costly transducers may be required to transduce the state of the actuator into a feedback signal to which a control function is responsive, adding further cost and complexity to the actuator integration process. It would therefore be desirable to separate control of an actuator from other system control functions.

SUMMARY OF THE INVENTION

The present invention provides an automotive control actuator interface for controlling and functionally isolating an actuator from an automotive control algorithm, improving overall control system performance and flexibility.

More specifically, a parameter, expressed in predetermined standard control units and controlled by an actuator (the actuator-controlled parameter), is estimated based on measured or estimated actuator position and is passed through a filter process. An estimate or measurement of an engine parameter significantly influenced by the value of the actuator-controlled parameter is provided and, if necessary, is converted to the predetermined standard control units. The engine parameter is selected, in accord with an aspect of this invention, as a parameter that may be used to indicate the state of the actuator-controlled parameter. In accord with a further aspect of this invention, the engine parameter is selected as a parameter that is already estimated or measured to support other engine operating procedures or that may be estimated or measured without adding significantly to system cost.

The engine parameter estimate or measurement is passed through a filter process. An error term indicating actuator position error is generated as a difference between the filtered engine parameter estimate or measurement and the filtered actuator-controlled parameter. An actuator bias term is adjusted to account for such error and is applied to correct the actuator position indicated by the actuator-controlled parameter. The corrected position indication is then applied to a control algorithm.

The control algorithm includes a control law for generating an actuator control command in the predetermined standard control units in response to a desired engine operating condition which may be controlled by an engine operator and which is consistent with engine fuel economy, emissions, and performance goals. The control algorithm is dedicated to compensating a controlled engine operating condition as actuator error is accounted for by the actuator interface, potentially improving control effectiveness. The actuator control command is output by the control algorithm, the bias is removed to restore the command to account for actuator error, and the restored command is converted to a desired actuator position. The converted command is then output to an actuator driver for controlling an actuator to drive a controlled engine parameter to a desired value.

The actuator interface thereby separates physical control of an actuator from its control system including its control algorithm, providing for integration of similar actuators with control systems including control algorithms with no control algorithm recalibration and with only minor recalibration of the actuator interface. Non-linear mapping characteristics of actuators can be linearized explicitly in the actuator interface removing complex and time-consuming non-linear control algorithm calibration and design procedures.

Actuator error is compensated in the actuator interface in response to feedback state estimate or measurement information, providing for application of dynamic spectral separation with the actuator interface dedicated to correcting actuator error and the control algorithm to correcting system level error. The dynamic spectral separation provides for decentralized error compensation, which allows for more effective, higher performance control.

BRIEF DESCRIPTION OF THE DRAWINGS

The invention may be best understood by reference to the preferred embodiment and to the drawings in which.

DESCRIPTION OF THE PREFERRED EMBODIMENT

Figure 1:
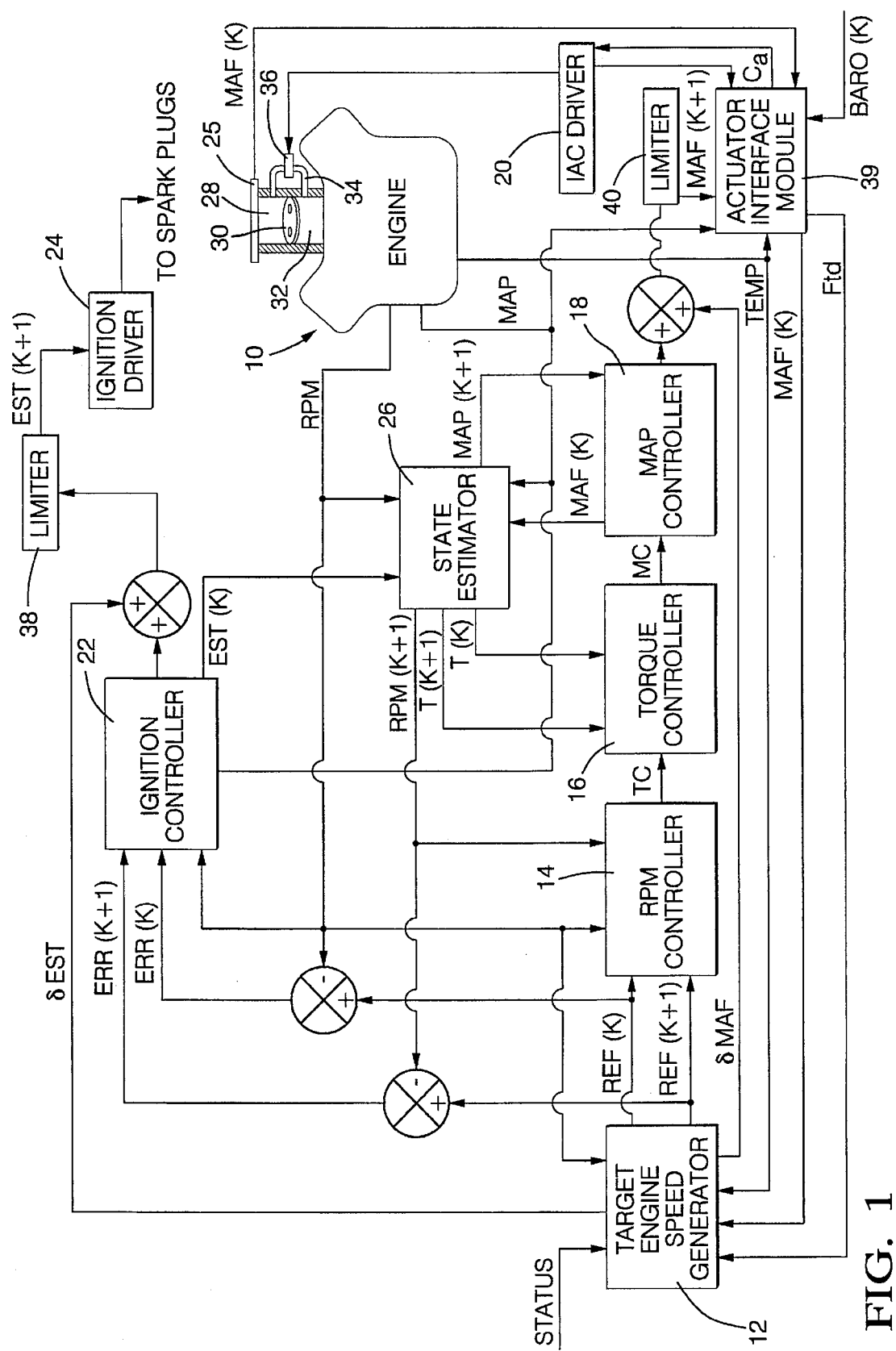
FIG. 1 is an overall diagram of the engine and engine control system including the actuator interface module in accord with the preferred embodiment of this invention.

Referring to FIG. 1, intake air is provided to internal combustion engine 10 via intake air path 28 past conventional mass airflow sensor 25 of the thick film or hot wire type. Inlet air valve 30 is disposed in the intake air path 28 and is of a well-known butterfly or rotary valve type, the degree of rotation of which restricts airflow from the intake air path 28 to an engine intake manifold 32. For airflow control at low engine speeds corresponding to relatively low intake airflow requirements that must be precisely controlled, such as at engine idle, the inlet air valve 30 may be substantially perpendicular to the direction of airflow through the intake air path 28 to severely restrict passage of air thereby.

At such low engine speeds in this embodiment, an appropriate intake airflow is provided by passing an intake air quantity through bypass conduit 34. The restrictiveness of bypass conduit 34 is controlled by positioning a conventional idle air valve 36, which may be a conventional binary solenoid valve, in the conduit. The position of the valve 36 responds to a varying command issued thereto from an idle air control IAC driver, such as a well-known device generating a fixed amplitude, fixed frequency, variable duty cycle command the on-time of which corresponds to an open valve position.

In an alternative embodiment in accord with this invention, the bypass conduit 34 and the idle air valve 36 may be eliminated, and precise control of engine inlet air may be provided through known electronic throttle control techniques, for example by directly controlling an electronic throttle actuator coupled to the inlet air valve 30 so as to precisely position the valve in the intake air path and thus provide a high resolution control of engine intake air, for example to meet the exacting requirements of engine idle air control. In such an alternative embodiment, the IAC driver 20 may be set up to drive the actuator coupled to the inlet air valve 30 to control the position thereof at all times while the engine 10 is operating.

The actuator 36 of the described preferred or alternative embodiments, or any conventional engine control actuator, is functionally isolated from its control system, such as the control system illustrated generally in FIG. 1, to be described, through the actuator interface module 39, providing for improved control performance and flexibility and reduced system cost and complexity. Generally, the actuator interface module allows for control system operation in standard control units, such as mass airflow units in the preferred embodiment, by estimating such units as a function of sensed actuator position, barometric pressure, temperature, etc. before application of actuator position or control information to the control system and by converting control system outputs into actuator command units before application thereof to the actuator. The actuator interface module 39 compensates actuator error conditions, making such conditions invisible to the control system, thereby freeing up the control system to devote its resources to resolving its control laws, which provides for improved control system performance. Further, the actuator interface module 39 predicts engine maneuvers that may reduce engine control stability and provides for an adjustment of integrated engine control parameters to improve stability without sacrificing engine control performance.

Actuator error is determined through a measurement or estimate of an operating parameter of the engine 10 that is already available for another use and that directly or indirectly indicates the value of an actuator-controlled parameter. The estimate or measurement is converted to the standard control units and is applied to an open-loop actuator position and the correction is applied before application of the actuator position information to the control system, and is then removed from the resulting control command from the control system before application thereof to the actuator. Accordingly, this invention enhances not only control system performance but also control system and actuator portability through simplified integration of actuators and control systems without detailed recalibration of the control system to account for actuator bias error or actuator functional limitations, as such is accounted for in the interface module.

Returning to FIG. 1, through the operation of the engine 10, an engine output shaft, such as a conventional crankshaft (not shown) rotates, the rotational speed of which may be designated as engine speed RPM, and may be measured by positioning a conventional rotational position sensor of the Hall effect or variable reluctance type in proximity thereto for transducing rotation of the output shaft into an output signal the frequency of which is proportional to engine speed RPM. Each cycle of the analog engine speed signal may correspond to an engine net torque producing combustion event, called a cylinder event in this embodiment.

The control system of FIG. 1 is provided in this embodiment for controlling engine speed through engine intake air and ignition timing control during an engine idle operating condition. The inventors intend that the actuator interface module 39 of FIG. 1 may further be applied with any control system for functionally isolating a controlled actuator from its control system. The engine speed control system of FIG. 1 is provided merely as one preferred example of a control system integrated with the actuator 36 and actuator interface module 39 in accord with this invention. The specific details of the overall engine idle speed control system of FIG. 1 beyond those details described herein are provided in U.S. Pat. No. 5,463,993, assigned to the assignee of this invention and hereby incorporated herein by reference.

Returning to FIG. 1, the absolute air pressure MAP in intake manifold 32 is sensed by a conventional pressure transducer disposed in the engine intake manifold 32 and communicated as output signal MAP. Engine coolant temperature is sensed via a temperature sensor (not shown), such as a conventional thermocouple disposed in an engine coolant circulation path, and is communicated as output signal TEMP. Signals RPM and TEMP are provided to a target engine speed generator 12, along with signal MAF' (K) representing a corrected measurement of an engine operating parameter expressed in standard control units of grams per second, and the status of a throttle drop flag Ftd indicating a potential throttle drop maneuver. The target engine speed generator 12 generates, in accord with a predetermined schedule stored in a memory device, a target engine speed REF(K), such as a desired engine idle speed for the present control cycle indicated by index K, and for a next consecutive control cycle REF(K+1), indicated by index K+1. The target engine speeds may be constant speeds, determined in accord with an appropriate engine operating level for idle, such as approximately 700 r.p.m., or may vary in accord with a predetermined schedule, such as an engine warm-up schedule, wherein the engine speed decreases with increasing engine coolant temperature TEMP.

The present target engine speed REF(K) and the predicted target engine speed REF(K+1) are communicated from the generator 12 to an RPM controller 14. In addition to the predicted engine speed information generated at the engine speed generator 12, feedforward terms are generated in accord with engine load status information provided to the generator 12. As is generally known in the art of engine speed control, the feedforward terms are estimates of the compensating engine speed change in the form of a desired increase in commanded engine inlet air $\delta$MAF or as an increase in engine spark advance $\delta$EST. Generally, a potential throttle drop maneuver is indicated by setting flag Ftd to a high value when an idle operating condition is present and a significant actuator error condition is detected by the actuator interface module 39, to be described. While flag Ftd is set, the target engine speed generator 12 in this embodiment increases its output $\delta$MAF by a predetermined amount and, to balance such increase, reduces its spark timing offset output $\delta$EST by a predetermined angle, to prepare for a throttle drop maneuver in which an engine operator may suddenly decrease an input command which can result in an unstable operating condition. If such a condition then occurs, the change in intake air rate may be compensated through relatively responsive spark timing angle control with sufficient air still available through the increased feedforward $\delta$MAF to maintain a robust engine idle speed control. The target engine speed information output by the generator 12 may further be increased by a predetermined speed offset while flag Ftd is set.

Other changes in known engine load may likewise be communicated to the generator 12 via the status information, so that engine idle air or spark advance may be adjusted in response thereto to maintain a stable engine idle speed, as is generally known in the art. The feedforward terms $\delta$MAF and $\delta$EST are communicated from the generator 12 for use in accord with this embodiment, as will be described.

The reference speed outputs of the speed generator 12 are provided to the RPM controller 14, as described, which is included in an outside control loop designed to compensate for rotational dynamic effects and for general disturbances incident on the engine speed control system of this embodiment. Measured engine speed RPM and predicted engine speed RPM(k+1) are generated by state estimator 26, to be described, and are likewise provided to the RPM controller 14 which issues a compensating desired torque command TC to mitigate the error between the reference REF(k) and present engine speed RPM, and the error between the reference REF(k+1) and the predicted engine speed RPM (k+1). The compensating desired torque command TC may be generated through application of conventional control techniques, such as through conventional proportional-plus integral-plus-derivative control techniques applied to the error values, as are well-known in the art.

The compensating torque command TC is provided to a middle control loop nested within the described outside control loop. Torque controller 16 resides within this middle control loop which is designed to compensate for fuel delivery and combustion delays in the system. Generally, this middle control loop including the torque controller 16 responds to a difference between desired torque TC and predicted actual engine torque via a conventional control strategy, such as conventional proportional-plus-derivative control strategy, to derive a desired engine intake air pressure command MC designed to appropriately compensate the torque difference. Provided as inputs to torque controller 16 are an estimated torque T(k+1) for a next consecutive cylinder event, and an estimated or measured engine torque value T(k) for the present cylinder event. The estimated torque values are provided by state estimator 26, to be described.

The generated command MC is then provided to an inside control loop nested within the middle control loop (and thus within the outside control loop). This inside control loop includes a MAP controller 18 which receives the command MC and receives an estimated engine intake manifold absolute pressure value MAP(k+1) for the next cylinder event from the state estimator 26, to be described. This inside loop compensates for manifold filling time delays by calculating a desired engine inlet air rate for the next cylinder event in response to the error between the desired MAP value MC and the predicted MAP value to command a new engine inlet air rate. The new inlet air rate may be generated by passing the described MAP error term through a conventional compensation function, such as a conventional proportional-plus-derivative control, to arrive at an inlet air rate to properly drive the predicted MAP toward the desired MAP, as is generally known in the art. The control stability of this inside loop is improved over that of the prior art by limiting the reach of the compensation provided thereby to manifold pressure error, such that only manifold filling time delay effects are within its scope.

The MAP controller 18 outputs a desired idle air command MAF(K) in standard control units of grams per second of air into the engine 10 in this embodiment to the state estimator 26, to be described, and outputs a desired idle air actuator command MAF(K+1), also in standard control units to be summed with the described idle air command feedforward term δMAF from the target speed generator 12. The sum of these two commands is next limited via conventional limiter 40, so as to not exceed any control system bandwidth constraints, and then is passed as signal MAF(K+1) to the actuator interface module 39 for conversion and conditioning before application as signal Ca in units of actuator counts to IAC driver 20 for timed application to the actuator 36. The time of issuance of the command Ca to the driver 20 should correspond to the time of the next (K+1th) engine cylinder event, such as is indicated by the described signal RPM. The actuator interface module 39 is further illustrated in FIG. 2, to be described.

Ignition controller 22 receives signals MAP, RPM, an error term generated as the difference between present engine speed RPM and REF(K), designated as ERR(k), and a predicted error term generated as the difference between predicted engine speed RPM(K+1) and REF(K+1), designated as ERR(K+1). In this embodiment, the ignition controller 22 is responsive to engine speed error to contribute to the compensation for rotational dynamic effects and all disturbances existing in the system. In other words, the compensation provided by ignition controller 22 of this embodiment addresses the processes addressed by the compensation of the outside control loop described above. The inventors have restricted the ignition controller-based compensation provided in this embodiment due to the limited authority of the ignition control of this embodiment and of typical engine speed control systems. The ignition control, which is charged with adjusting spark advance angle to trim engine torque, as is well-known in the art, is typically limited to approximately ten degrees of spark advance angle authority. As such, its degree of engine speed control authority is significantly limited. While ignition control in accord with this invention could be applied as compensation for any of the described processes compensated in this embodiment, it has been relegated to compensation for rotational dynamic effects and system level disturbances.

The ignition controller 22 is provided the engine speed error information for generation of an appropriate spark advance angle adjustment to reduce the error in a controlled manner toward zero. For example, a conventional proportional-plus-derivative control strategy may be employed to act on and drive any engine speed error, whether for the present cylinder event or for the next cylinder event, toward zero. Added to any such compensating advance angle in this embodiment is a minimum spark advance for best torque MBT value, as may be referenced from a conventional non-volatile memory device as a predetermined function of such reference engine parameters as engine speed RPM and manifold absolute pressure MAP.

MBT is a generally-known spark advance for the current engine operating conditions to provide the maximum engine output torque without causing engine knock. MBT is referenced from memory and added to the compensating value to provide an advance value output from ignition controller 22 to be summed with the described feedforward term δEST from the target engine speed generator 12. The sum is limited via limiter 38, so that the command does not exceed any hardware or bandwidth constraints, and is then passed as spark advance command for the next cylinder event EST (K+1) to ignition driver 24, which may generate ignition commands for the active one(s) of the engine spark plugs (not shown) and deliver such commands at the engine operating angle dictated by the top dead center position of the next cylinder to have a combustion event advanced in accord with the command EST(k+1).

The state estimator 26 of FIG. 1 receives engine parameter information, and provides a prediction of engine states used in accord with this invention. Input information to the state estimator 26 includes engine speed RPM, manifold absolute pressure MAP, present idle air command MAF(K) in the described standard control units from MAP controller 18, and present spark advance command EST(K) from ignition controller 22. From this information, engine speed is predicted for the next cylinder event RPM(K+1), engine torque is predicted for the next cylinder event T(K+1) and is estimated for the present cylinder event T(K), and manifold pressure is predicted for the next cylinder event MAP(K+1). Such prediction may be carried out using any conventional parameter prediction means. Preferably however, the engine speed and torque prediction techniques described in U.S. Pat. No. 5,421,302, assigned to the assignee of this application, are to be applied as the portion of the state estimator 26 used to predict RPM(K+1), T(K+1), and T(K). Furthermore, the prediction approach described in the U.S. Pat. No. 5,094,213, assigned to the assignee of this application, is preferably applied as the portion of the state estimator 26 used to predict MAP(K+1).

Figure 2:
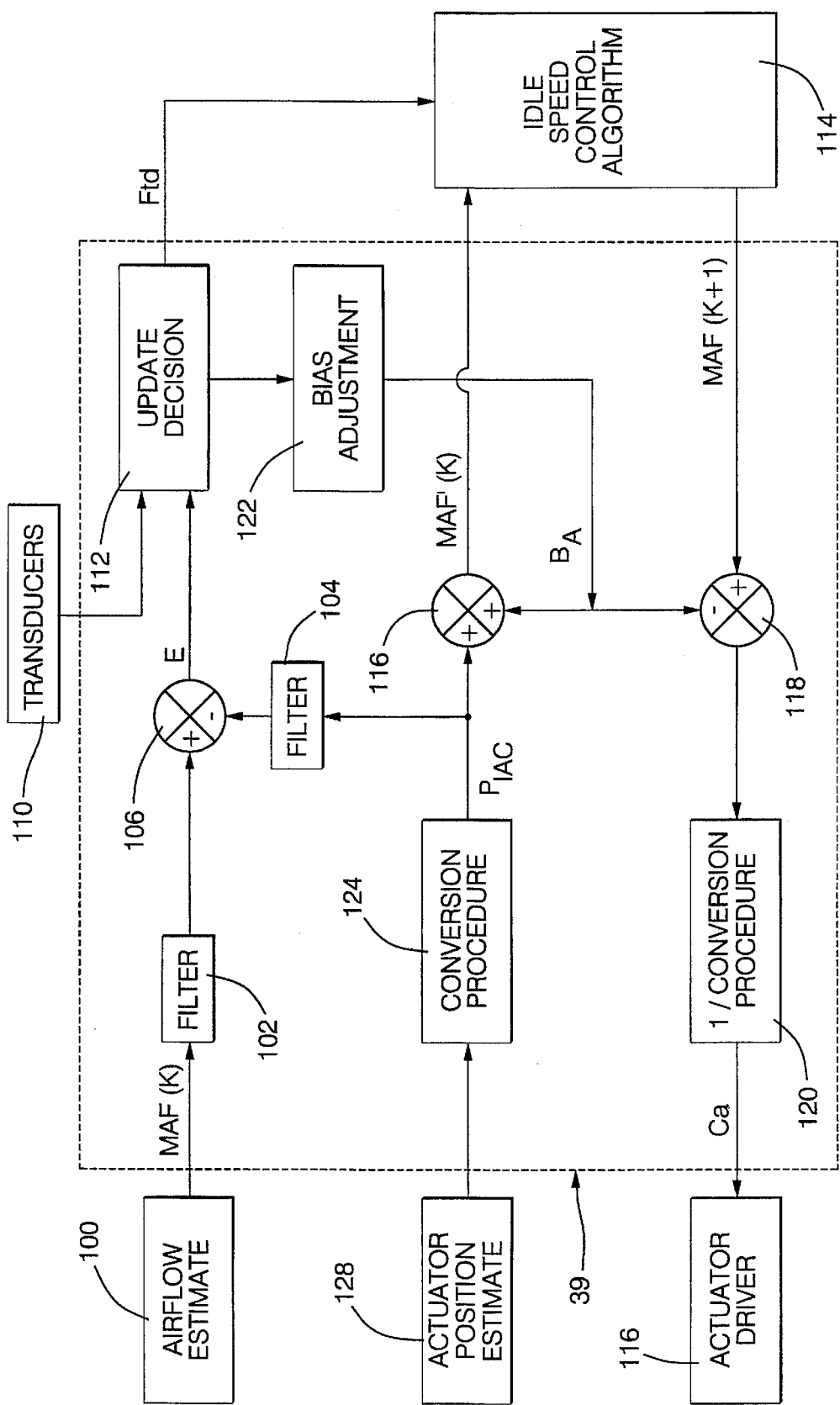
FIG. 2 is a general block diagram of the actuator interface module of FIG. 1 together with the inputs and outputs thereof.

Referring to FIG. 2, the actuator interface module 39 of FIG. 1 is illustrated in the form of a general block diagram for illustrating signal flow therethrough in accord with this embodiment. The mass airflow measurement or estimate MAF(K) is provided via block 100, such as through the described mass airflow sensor 25 of FIG. 1, or through state estimation as may be provided by state estimator 26 of FIG. 1. Such state estimator 26 and sensor hardware is typically required for other engine control use and therefore is relied on in this embodiment to provide for actuator error correction without additional system cost or complexity, as described. The mass airflow information is provided in units of grams per second or similar units in this embodiment as standard control units for the control system of FIG. 1. The mass airflow information is passed through a conventional filter process 102, such as a commercially available exponentially weighted moving average (EWMA) process the output of which is applied to summing node 106.

An actuator position count is maintained in a non-volatile system memory device represented as block 128, such as an open-loop count of the commanded position of the actuator 36 of FIG. 1, expressed in actuator counts or similar units. The position count is converted to standard control units of grams per second through the conversion process 124 having output $P_{IAC}$ which is provided to conventional filter process 104, such as an EWMA process corresponding to that described for filter 102. The filtered $P_{IAC}$ signal is subtracted from the filtered mass airflow estimate at summing node 106 the output of which is actuator position error E away from the position indicated by the current measured MAF value. The error E, as well as engine parameter sensor output information including signals MAP(K), BARO(K), actuator position, RPM(K), STATUS, Ftd, and TPS are applied to decision block 112 for actuator error compensation through adjustment of bias term $B_A$ and for a determination of whether a throttle drop condition is present, in which case flag Ftd is set.

Specifically, if conditions are present under which the actuator position estimate is typically highly accurate and the engine is in a steady state operating condition, the bias term $B_A$ is adjusted as a function of actuator error E. Further under such conditions, if the error E exceeds a calibrated error threshold Thr, to be described, flag Ftd is set indicating presence of a throttle drop B condition. The conditions under which the estimate is assumed to be highly accurate include, in this embodiment, sonic airflow, TPS signal indicating a closed throttle valve 30 (FIG. 1), MAF signal within a predetermined range in which it is considered highly accurate, and substantially steady bypass valve position over a predetermined time period or number of samples. The update decision block 112 provides a decision on the presence of said conditions to bias correction block 122 for updating bias correction term $B_A$ as a function of error E.

The adjusted bias correction term $B_A$ is output by correction block 122 to summing node 116 to be added to command $P_{IAC}$ before application of $P_{IAC}$ to the idle speed control algorithm 114, such as is represented by the control structure of FIG. 1 including the described nested control elements 14, 16, and 18 thereof. The corrected $P_{IAC}$ value, termed MAF' (K) is applied to the control algorithm as an indication of current actuator position excluding actuator bias error, so that accurate, responsive control correction may be applied through the control law of the control algorithm, without compensating for actuator error which may add lag to control responsiveness and may reduce control algorithm bandwidth.

The output of the control algorithm represented by block 114 is a commanded engine intake air rate MAF(K+1) needed to achieve engine idle speed control performance, stability, etc. and is provided to the actuator interface module 39 in standard control units of grams per second in this embodiment. The bias adjustment $B_A$ is removed from the command at summing node 118, to account for actuator position error, and the corrected command is then applied to conversion block 120 to convert the command from the standard control units to actuator counts, labeled as actuator command Ca as understood by the actuator drive circuitry, such as the driver 20 of FIG. 1. The conversion block outputs the actuator command counts Ca to the actuator controller 116, which takes the form of the driver 20 of FIG. 1 in this embodiment.

Figure 3:
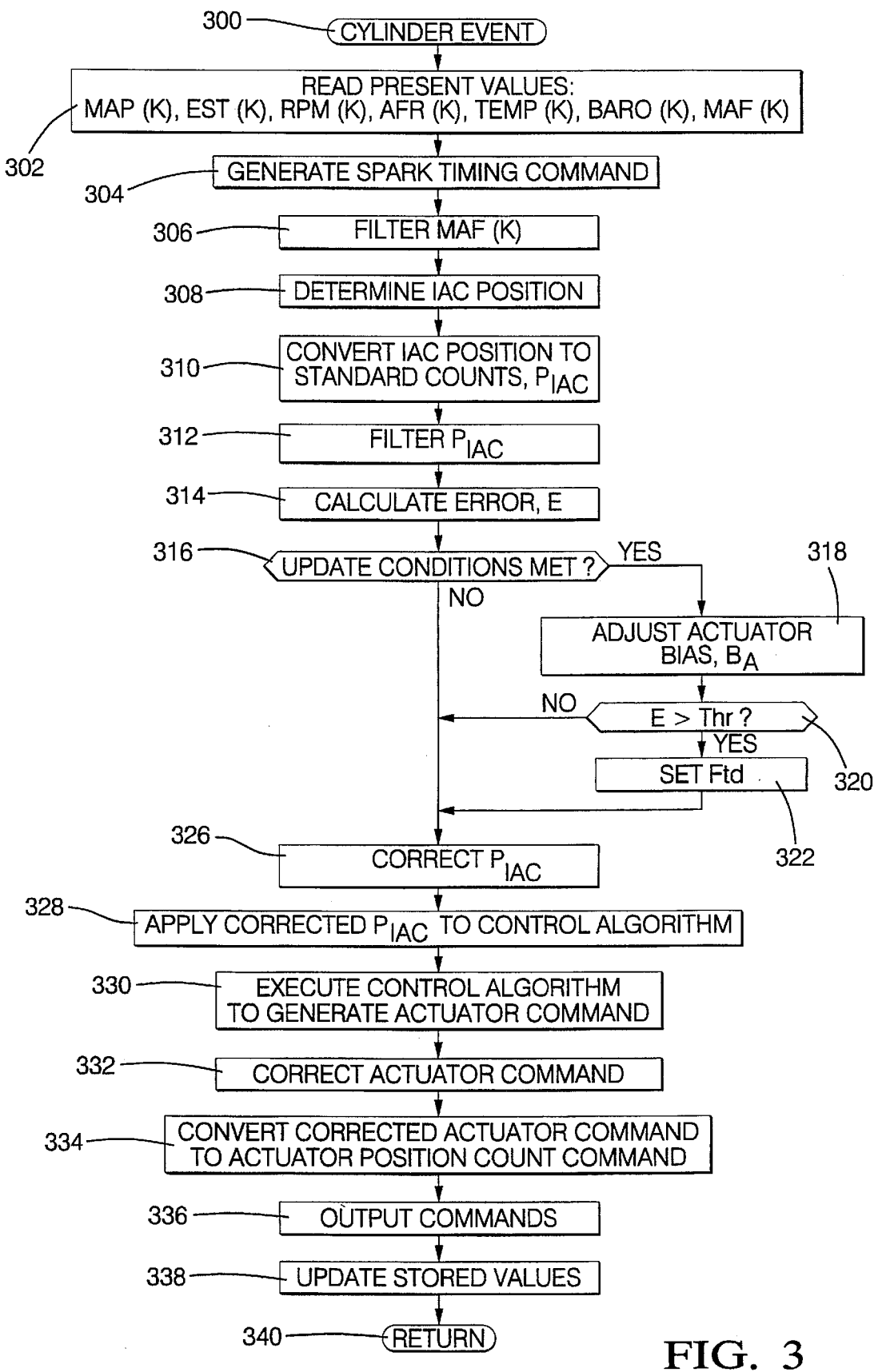
FIG. 3 is a flow diagram illustrating a flow of controller operations for carrying out engine control operations of the control system of FIG. 1.

Referring to FIG. 3, a flow of operations is illustrated as is intended to be executed by a conventional engine controller (not shown), such as a commercially available thirty-two bit single chip microcontroller including such generally known elements as a central processing unit, read only memory devices, random access memory devices, and input/output control devices which is well-established in the art as being available to receive sensor output signals and, through execution of a plurality of stored program instructions, provide for engine control, diagnostic and maintenance functions including, in this embodiment, engine speed control functions as illustrated in FIG. 1 which operate during engine idle operating conditions. The program instructions may be stored in read only memory devices and may be selectively executed by the controller upon occurrence of any of a plurality of timer-based and event-based events.

Specifically in this embodiment, upon occurrence of engine cylinder events, described in this embodiment as net torque producing combustion events in any of the multiple cylinders of the engine 10 of FIG. 1, the controller is configured to initiate, when an idle operating condition is present, for example as characterized by a substantially closed intake air valve 30 of FIG. 1 while the engine is running at a relatively low engine speed, idle speed control operations, by proceeding to the series of operations illustrated generally as FIG. 3. The idle speed control operations start at a step 300 and proceed to a step 302 at which signals indicating current values of engine control parameters may be read, including a present commanded spark advance EST(K) as provided by ignition controller 22 (FIG. 1), present engine air/fuel ratio AFR(K) as generated from an air/fuel ratio sensor (not shown), such as from a conventional zirconium-oxide sensor disposed in the engine exhaust gas path (not shown), present engine speed RPM (K), present intake manifold absolute pressure MAP(K), present coolant temperature TEMP(K), present barometric pressure BARO(K) such as from a conventional barometric pressure sensor (not shown) or from the MAP sensor output signal MAP(K) under low load, wide-open intake valve 30 conditions, and present engine intake bore mass airflow MAF(K).

A spark timing command EST(K+1) is next generated and limited at a step 304, for example in the manner described in the incorporated reference for issuance to the ignition driver 24 of FIG. 1 for controlling timing of ignition for the next ("K+1"th) cylinder combustion event. The input signal MAF(K) is next filtered at a step 306 by applying MAF(K) to a standard filter process taking the form of an EWMA process in this embodiment, as described. Current IAC actuator position is next determined at a step 308, such as from a stored open-loop actuator position count, as described. Current IAC position is expressed, in this embodiment, in position counts wherein each count corresponds to a degree of actuator position displacement away from an initial (closed) position. The IAC position count is next converted to standard control units, labeled $P_{IAC}$, at a step 310. The standard control units in this embodiment are the units of mass airflow, typically grams per second. The position value $P_{IAC}$ is next filtered at a step 312 using the EWMA filter process to which the MAF(K) signal was applied at the step 306, so that direct comparison of the two filtered values may be provided. An error term E is next calculated at a step 314, representing the difference between the actual measured mass airflow MAF(K) provided by mass airflow sensor 25 of FIG. 1 (or by a mass airflow state estimate in an alternate embodiment of this invention) and the mass airflow corresponding to the stored actuator count value $P_{IAC}$. As described, the error E represents actuator error. If update conditions under which an accurate actuator position estimate can be made, as described, are met at a next step 316, the actuator bias term $B_A$ is adjusted as a function of error E at a next step 318. The manner of adjusting $B_A$ may take any of a plurality of conventionally understood forms. For example, for relatively large error E magnitude, such as E greater than a calibrated threshold Thr, a rapid, relatively granular adjustment of $B_A$ may be made to rapidly account for significant actuator error. Alternatively, for relatively small error E magnitude, such as E less than Thr, $B_A$ may be adjusted incrementally and perhaps, relatively slowly, such as through an integrator control function.

The error E is next compared to a threshold error magnitude, such as the described calibrated threshold Thr, which is set to about 0.5 grams per second in this embodiment, at a step 320. If E exceeds Thr, a throttle drop condition is indicated by setting, at step 322, flag Ftd to a high level, which flag is available for adjusting spark timing term δEST, intake airflow command δMAF, etc. as described, to decrease control sensitivity to a throttle drop condition. The flag Ftd is, in this embodiment, cleared through operations not specifically detailed in this embodiment after the described adjustments are made to decrease control sensitivity to a throttle drop condition.

Next, or if E is not greater than Thr at the step 320, or if the update conditions were not met at the described step 316, the count $P_{IAC}$ corrected in accord with the term $B_A$ at a next step 326, and the corrected $P_{IAC}$ value is then applied to the control algorithm at a next step 328. The series of procedures making up the operations of the control algorithm illustrated in FIG. 1 and described in detail in the incorporated reference are carried out, represented by step 330, to process the input $P_{IAC}$ and other control algorithm inputs as described in FIG. 1 to arrive at a commanded mass airflow into the engine expressed in standard control units of grams per second. The control algorithm is not constrained by actuator error, such as from actuator non-linearities or compliance, etc. as such is accounted for in the actuator interface module 39 of FIG. 2, in accord with this embodiment of the invention. Upon completion of the operations of the control algorithm as represented by the step 330, the resulting actuator command is corrected by removing the bias term $B_A$ therefrom at a step 332. The corrected command is converted to actuator units, such as the described actuator counts at a next step 334, and is then output to the IAC driver 20 of FIG. 1 at a next step 336 as command Ca. Further, the spark timing command EST(K+1) generated at the step 304 may be output to the ignition driver 24 of FIG. 1 at the step 336. Next, stored values including the current bias adjustment value $B_A$, EWMA filter values, and the current open-loop actuator position count as updated through execution of the prior operations of FIG. 3 are stored in controller memory, such as in random access memory devices thereof at a step 338 for use in subsequent iterations of the operations of FIG. 3. A next step 340 is executed to return to and resume execution of any controller operations that were ongoing and were temporarily suspended to provide for execution of the operations of FIG. 3.

The preferred embodiment for the purpose of explaining this invention is not to be taken as limiting or restricting the invention since many modifications may be made through the exercise of ordinary skill in the art without departing from the scope of the invention.

The embodiments of the invention in which a property or privilege is claimed are described as follows:

1. A method for controlling a position of an actuator applied in an internal combustion engine, comprising the steps of:

estimating a value of an engine parameter controlled by the position of the actuator;

determining a value of an engine parameter influenced by the position of the actuator;

converting at least a predetermined one of the estimated value and the determined value so that the estimated value and the determined value are represented in common, predetermined units of measure;

calculating a difference between the estimated value and the determined value, the calculated difference being represented in the predetermined units of measure;

generating a correction value as a predetermined function of the calculated difference;

applying the correction value to the estimated value to form a corrected estimate;

outputting the corrected estimate to a controller including a control function for determining a desired control value as a function of the corrected estimate;

removing the correction value from the desired control value to form a restored desired control value;

converting the restored desired control value to a desired actuator position; and controlling actuator position to the desired actuator position.

2. The method of claim 1, wherein the actuator is mechanically linked to an engine intake air control valve, and the engine parameter controlled by the position of the actuator is a parameter indicating a degree of opening of the air control valve.

3. The method of claim 2, wherein the engine parameter influenced by the position of the actuator is mass airflow rate into the engine.

4. The method of claim 1, wherein the desired control value is represented in the predetermined units of measure.

5. The method of claim 1, wherein the desired control value is a desired value of the engine parameter influenced by the position of the actuator.

6. The method of claim 1, wherein the predetermined units of measure correspond to a time rate that units of intake air mass enter the engine.

7. The method of claim 1, wherein the predetermined units of measure correspond to a time rate that units of intake air volume enter the engine.

8. An internal combustion engine control method for controlling a position of an actuator, comprising the steps of:

estimating actuator position;

transducing an engine parameter into an output signal indicating a current value of the engine parameter, the engine parameter influenced by the position of the actuator;

converting the estimated actuator position into an equivalent value of the engine parameter;

generating an actuator error term as a difference between the current parameter value and the equivalent value of the engine parameter;

calculating a correction factor as a predetermined function of the actuator error term;

applying the correction factor to the equivalent value to form a corrected equivalent value;

applying the corrected equivalent value to a controller having a control function for determining a desired value of the engine parameter as a function of the corrected equivalent value;

calculating an additional correction factor as a predetermined function of the actuator error term;

applying the additional correction factor to the desired value of the engine parameter to form a corrected desired value;

converting the corrected desired value into an equivalent desired actuator position; and controlling the actuator to drive actuator position toward the equivalent desired actuator position.

9. The method of claim 8, wherein the engine parameter is engine intake air flow rate.

10. The method of claim 8, wherein the correction factor and the additional correction factor have substantially the same value.

11. The method of claim 8, wherein the estimating step comprises the steps of:

transducing actuator position into a position output signal; and applying the position output signal to a signal filter process to form a filtered position signal.

12. The method of claim 11, wherein the output signal indicating a current value of an engine parameter is applied to the signal filter process to form a filtered parameter value, and wherein the generating step generates the actuator error term as a difference between the filtered position signal and the filtered parameter value.

13. The method of claim 8, wherein the actuator is a motor mechanically linked to an engine intake air control valve.

* * * * *